United States Patent [19]

Murphy et al.

[11] Patent Number: 5,242,028
[45] Date of Patent: Sep. 7, 1993

[54] MOTORIZED BICYCLE DRIVE SYSTEM

[76] Inventors: Lisa J. Murphy, 157 Elm St., #304, San Mareo, Calif. 94401; Thomas E. Mirades, 103 LaCuesta, Burlingame, Calif. 94010

[21] Appl. No.: 825,601

[22] Filed: Jan. 24, 1992

[51] Int. Cl.⁵ ..................... B62K 11/00; B62M 23/02
[52] U.S. Cl. ..................... 180/220; 180/230; 180/205; 474/218; 248/222.1
[58] Field of Search ............ 248/222.1, 225.1; 474/227, 223, 224, 218; 464/49; 180/220, 230, 205, 206, 207; 74/594.2

[56] References Cited

U.S. PATENT DOCUMENTS

| 610,583 | 9/1898 | Fox | 474/218 |
|---|---|---|---|
| 1,938,415 | 12/1933 | Campbell | 474/218 |
| 4,030,562 | 6/1977 | Leighton et al. | 180/220 X |
| 4,059,209 | 11/1977 | Grisel | 248/222.1 X |
| 4,140,195 | 2/1979 | Watanabe et al. | 180/33 C |
| 4,280,581 | 7/1981 | Rudwick | 180/207 |
| 4,393,954 | 7/1983 | Soucy et al. | 180/205 |
| 4,397,369 | 8/1983 | Read | 180/205 |
| 4,410,060 | 10/1983 | Cunard | 180/220 X |
| 4,541,500 | 9/1985 | Gelhard | 180/205 |
| 4,871,042 | 10/1989 | Hsu et al. | 180/220 |
| 5,076,386 | 12/1991 | Ferneding | 180/205 |

FOREIGN PATENT DOCUMENTS

| 2164615 | 3/1986 | United Kingdom | 180/230 |
|---|---|---|---|
| 2193936 | 2/1988 | United Kingdom | 180/220 |

Primary Examiner—Margaret A. Focarino
Assistant Examiner—Peter C. English

[57] ABSTRACT

A motorized bicycle drive system featuring a motor drive with a one-way clutch, a pedal drive with a one-way clutch and a motor driveable sprocket, a removable interconnecting drive chain for interconnecting the two drives, and, a mounting device for detachably mounting the motor drive to a bicycle, whereby a motorized bicycle drive system can be compact, inconspicuous and easily removed from and remounted to a bicycle.

4 Claims, 3 Drawing Sheets

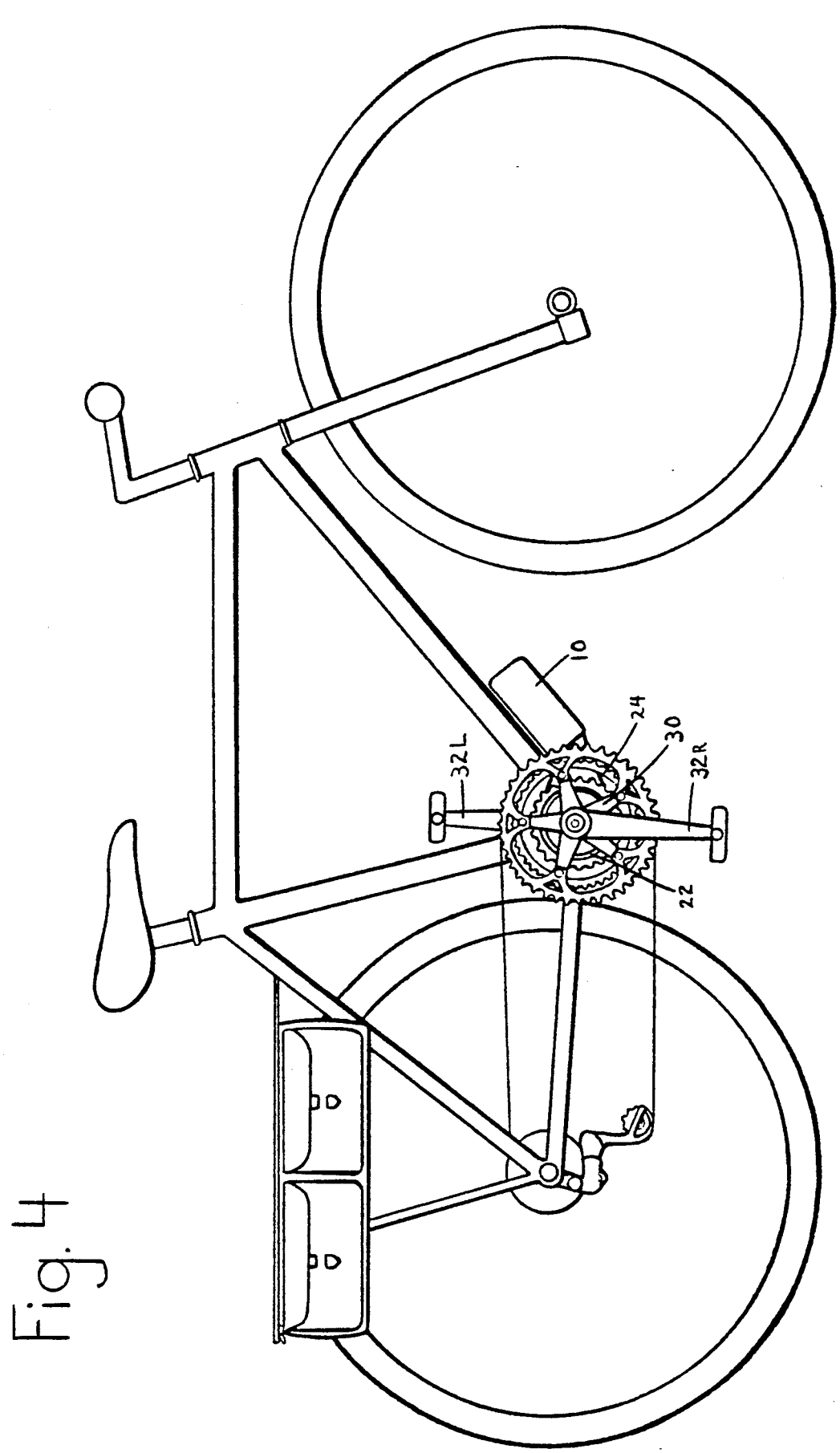

MOTORIZED BICYCLE DRIVE SYSTEM

BACKGROUND—FIELD OF INVENTION

This invention relates to motorized bicycle drive systems, more specifically, to motorized bicycle drive systems which combine into one interworking unit a motor drive and all of the standard operational features of a standard type multiple speed gear bicycle.

BACKGROUND—DISCUSSION OF PRIOR ART

Previous motorized bicycle drive system designs have offered solutions to the problem of significantly powering a bicycle with a motor while incorporating most of the bicycle's operational features, but none of these solutions have been mechanically or cosmetically simple. Past designs have been more inclined towards added mechanical hardware than towards the utilization of existing bike hardware. Extra gears, gearboxes, chains, and sprockets are often featured conspicuously on such designs and added motor accessories such as throttles, belts, and shields are also commonly featured. In either electric motorbikes or gas powered motorbikes heavy, excessive, and conspicuous mechanical apparatuses have prevailed due to the mechanical challenge of uniting a motor drive with standard bicycle functions in a simple manner. These designs have, overall, compromised the vehicles upon which they are featured far more than enhanced them.

The most crucial problem with prior motorized bicycle drive systems is that they present a bicycle which has a more narrow funtional scope than that of a standard type non-motorized multi-speed bike. U.S. Pat. No. 4,541,500 to Gelhard (1985) presents a bike which in all of its suggested embodiments possesses less gearing scope than is available on more standard types of multi-speed bikes, such as ten, fifteen, or twenty-one speeds. It also presents a bike which has increased operational requirements with regard to motor input regulation, and a costly addition of parts in the form of chain wheels, electrical components, a manual clutch, etc. Lastly, the bike is a significant cosmetic compromise; most of the hardware is situated conspicuously and the result is a bike which no longer looks sporty or lightweight.

U.S. Pat. No. 4,393,954 to Soucy et al. (1983) is another attempt at marrying a motor drive to a bicycle's standard functions but it falls short in that it presents gross inconveniences with regard to pedaling the bike interchangably with the motor drive. In one embodiment the pedal mode is totally unusable. In a second embodiment the pedals have to be unlocked by hand prior to motor engagement at which point they become unusable. Foot rests are provided in this design, presumably to provide a comfortable place for the rider's feet during motor engagement, and yet in their designated location it would be awkward for one to use them as they would hinder the turning of the front wheel. This design presents a bicycle with serious functional problems.

U.S. Pat. No. 4,280,581 to Rudwick (1981) presents a more mechanically sound vehicle than the aforementioned design, but it also presents a design featuring an unnecessary and unattractive addition of mechanical parts, such as an additional and rather conspicuous looking drive chain and sprocket assembly. Further, this design necessitates a distorted bicycle frame. Even with the motor and the battery removed this bicycle wouldn't closely resemble a standard bicycle, and therefore wouldn't be suitable for the person who prefers a motorized bike which can be easily changed over to a cosmetically standard bike.

U.S. Pat. No. 4,140,195 to Watanabe et al. (1979) presents an apparatus which, when featured on a bicycle, presents a vehicle which doesn't possess the normal type of gearing system provided on a standard type multi-speed bicycle. This system cannot actually be featured on any kind of normal bicycle because of its weight and bulk. This system necessitates a vehicle which is a dramatic diviation from a standard bicycle in weight and handling; a vehicle which would not feel or operate like a normal bike in either pedal or motor mode. Its numerous parts and its mechanical complexity would also make this a relatively expensive product.

U.S. Pat. No. 4,397,369 to Read (1983) presents a motor drive system for a bike which has amongst its drawbacks a serious mechanical weakness: a belt and pulley system for relaying power from the motor to the bike which isn't likely to be stable under a substantial load. Further, as with U.S. Pat. No. 4,393,954 this design has no mechanical solution to the problem of creating a pedal and motor drive which work conveniently and harmoniously together. Also, this design specifically limits itself to the utilization of five bicycle gear speeds by linking the motor drive directly to the larger of the two bicycle drive sprockets. Further, its looks, weight, noisiness, handling qualities, and the location of its exhaust emmision, would make it undesirable to any reasonable person as a serious means of transportation.

The popularity of motorized bicycles has been minor in comparison to motorcycles, automobiles, and even standard type non-motorized bikes to this point in time, despite a number of attempts at new and improved designs, and this is due to the failure of these designs to truly enhance bicycles rather than merely change them. These "changed" versions more closely approach motorscooters or motorcycles in cost, complexity, and handling sensation, and yet are in large part inferior to such vehicles.

Motorized bicycle drive systems to this point in time suffer from a number of disadvantages:

a. they possess excessive and in most cases unnecessary hardware, b. they preclude or diminish one or more of the standard functions which are featured on a standard type non-motorized multiple speed gear bicycle, c. their conspicuous parts are not easy to remove from a bicycle so that a bicycle can be easily changed over to the appearance and handling sensation of a standard bicycle, d. they necessitate a vehicle which is, because of its excess in parts, excessively expensive, e. they necessitate a vehicle which is, cosmetically, a severely compromised version of a standard bicycle.

OBJECTS AND ADVANTAGES

Accordingly, the objects and advantages of our system are as follows:

(a) to provide a significantly powerful motorized bicycle that is mechanically sound and simple, (b) to provide a motorized bicycle which brings the motor drive and all of the functional features of a standard type multi-speed gear bicycle together as an efficiently interworking unit, (c) to provide a motorized bicycle with a motor drive system whose conspicuous parts can be easily removed if so desired and will therefore allow a motorized bicycle to be easily changed over to the appearance and handling sensation of a standard type non-motorized bicycle.

(d) to provide a less expensive motorized bicycle drive system, (e) to create a motorized bicycle drive system which allows the bicycle on which it is featured to maintain a close resemblance in appearance and handling sensation to that of a standard type non-motorized multi-speed gear bicycle.

Further objects and advantages of our invention will become apparent from a consideration of the drawings and ensuing description of it.

DRAWING FIGURES

In the drawings, closely related figures have the same number but different alphabetic suffixes.

FIG. 4 shows a side view of an entire bicycle featuring the preferred embodiment of The Motorized Bicycle Drive System.

DESCRIPTION—FIGURES 1 AND 4

Figure 1:
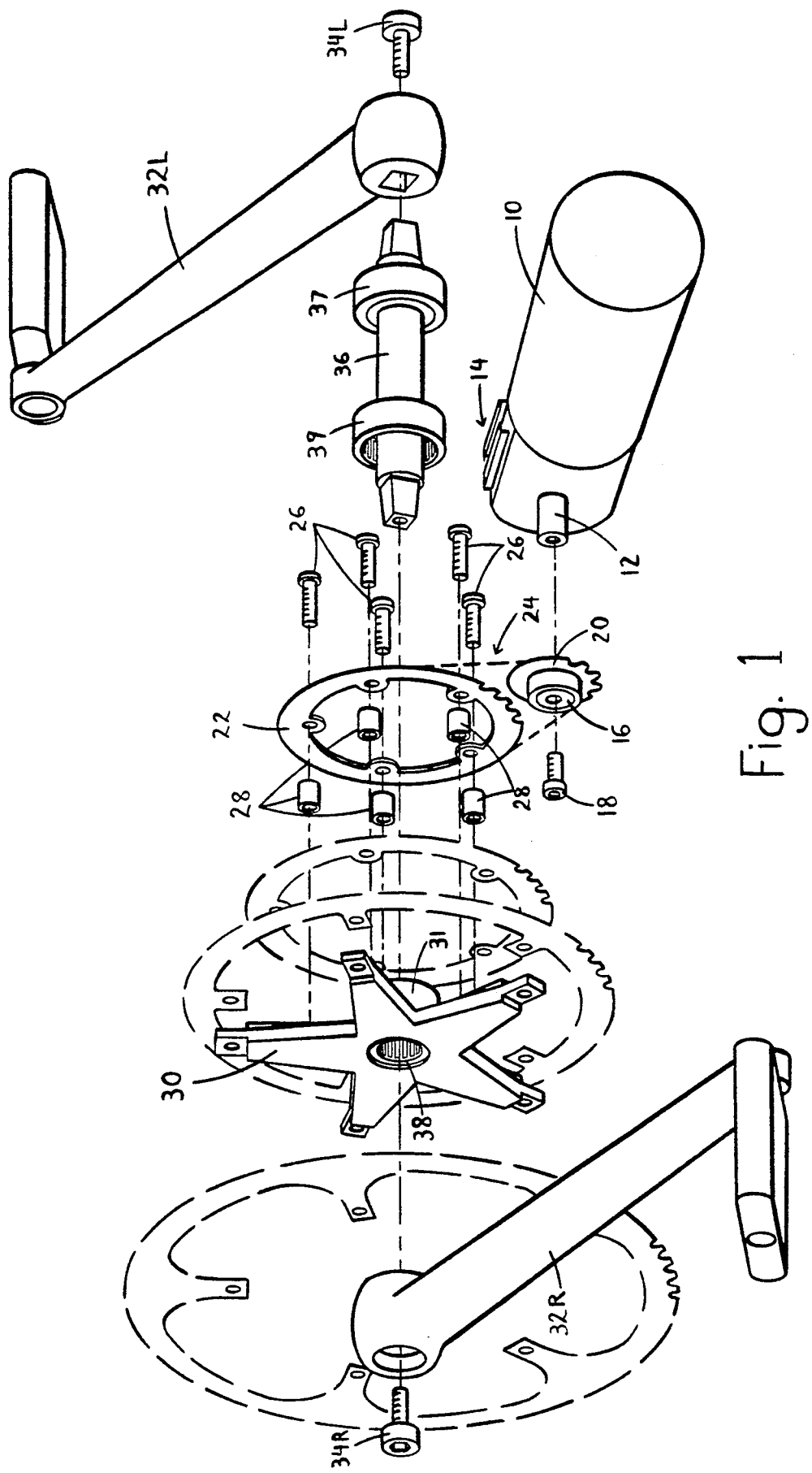
FIG. 1 shows an exploded view of the preferred embodiment of The Motorized Bicycle Drive System.

Referring now to the accompanying drawings, particularly FIG. 1, the motorized bicycle drive system has an electric gearmotor 10 which mounts onto a bicycle frame via a slide mount 14 (which is shown and explained in detail later with respect to FIG. 2). Motor 10 is a 12 volt motor possessing a horsepower of two thirds and an output to a motor drive shaft 12 of 120 RPMs. Shaft 12 extends from the gearbox of motor 10 and is journaled through a one-way clutch 16. One-way clutch 16 is a needle-bearing roller clutch of a width of 15.88 mm and an inner diameter of 15.88 mm, which is consistent with the outer diameter of shaft 12. Clutch 16 possesses one closed side with a center hole that aligns with a threaded hole in the end of shaft 12. Clutch 16 secures to the end of shaft 12 with a shoulder bolt 18. Shoulder bolt 18 secures clutch 16 to shaft 12 while allowing the closed side a raceway in which to spin.

Figure 3:
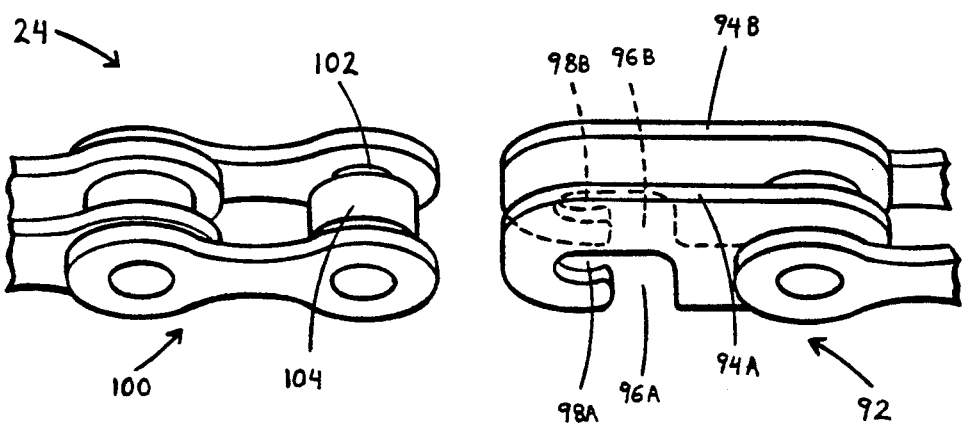
FIG. 3 shows a perspective view of the attaching and detaching links of a manually attaching and detaching drive chain.

A drive sprocket 20 possesses a hub which is fitted tightly around the outer race of one-way clutch 16. A driven sprocket 22 is interconnected with drive sprocket 20 by a manually attaching and detaching drive chain 24 (which is shown and described in detail later with respect to FIG. 3). Drive sprocket 20 and driven sprocket 22 are sized for a further speed reduction ratio of 2:1 in the motor drive. A set of connection bolts 26 project through five uniformly spaced holes in driven sprocket 22, and through a set of spacers 28, and finally through five threaded holes on the backside of a sprocket connector 30. Driven sprocket 22 and sprocket connector 30, therefore, are adjacent and have aligned centers.

Referring now to both FIGS. 1 and 4, sprocket connector 30 is similar in structure to most standard star-shaped bicycle sprocket connectors in that it is metal, has a center hole through which a pedal shaft can project, and features five connection fingers. As with standard sprocket connectors, connector 30 features a first set of holes, each of which is located at the tip of each finger for the mounting of the largest and second largest bicycle drive sprockets. Sprocket connector 30 also features a second set of holes with threads which are closer into the center than the first set of holes. These holes accommodate the connection of the third largest bicycle drive sprocket.

Sprocket connector 30 is dissimilar to most standard type sprocket connectors in that it features a hub 31 at the center of its backside of an inner diameter of 22.22 mm. Sprocket connector 30 is also unique in that it features a third threaded hole on the backside of each finger, each of which is located closer towards the center of sprocket connector 30 than the second set of holes. This third series of holes receives bolts 26.

Sprocket connector 30 is also dissimilar to most presently styled sprocket connectors in that it is not directly attached to or made as one piece with the pedal on the sprocketed side of the bike. Sprocket connector 30 connects to a standard type multi-speed bicycle's drive sprockets in the usual, known manner.

Referring back exclusively to FIG. 1, the motorized drive system further includes two pedals 32R and 32L, each of which are of the standard type which fasten onto a squared, tapered end of a pedal shaft with a bolt and unfasten from a pedal shaft by the removal of that bolt. Pedals 32R and 32L are affixed to either end of a pedal shaft 36 via bolts 34R and 34L.

Pedal shaft 36 is made of hardened metal and has an outer diameter of 15.88 mm. Pedal shaft 36 is journaled through a first support bearing 37 and a one-way clutch 38. Support bearing 37 is a ball-type roller bearing with an inside diameter which is consistent with the outer diameter of pedal shaft 36 and an outer diameter of 34.5 mm. Clutch 38 is a needle-bearing roller clutch of an inner diameter which is consistent with the outer diameter of pedal shaft 36, an outer diameter of 22.22 mm, and a width of 30 mm.

Clutch 38 is pressed within hub 31 and hub 31 is journaled within a second support bearing 39. Support bearing 39 is a needle-type roller bearing with an outer diameter which is consistent with that of bearing 37 and an inner diameter of 28.15 mm (which is the outer diameter of hub 31). Bearings 37 and 39 are fitted within a bicycle's pedal shaft housing in the known manner.

OPERATION—FIGURE 1

In operation, when gearmotor 10 is engaged (manually by switch) shaft 12 turns at 120 RPMs. Shaft 12 engages the clutch mode of first one-way clutch 16. One way clutch 16 engages drive sprocket 20 in the axial direction which in turn drives drive chain 24 and driven sprocket 22. Further gear reduction takes place between drive sprocket 20 and driven sprocket 22 with the result that driven sprocket 22 turns in the axial direction at 60 RPMs. Driven sprocket 22 conveys axial rotation to sprocket connector 30. Sprocket connector 30 conveys axial rotation to the bicycle's drive sprockets in the known manner.

In further operation according to FIG. 1, pedals 34R and 34L, when engaged, drive pedal shaft 36 in the axial direction. Pedal shaft 36 engages the clutch mode of second one-way clutch 38 which in turn drives sprocket connector 30 in the axial direction. Sprocket connector 30 in turn conveys axial rotation to the bicycle's drive sprockets in the known manner.

In further operation according to FIG. 1, when motor 10 creates a momentum in the motor drive which is greater than the momemtum in the pedal drive, one-way clutch 38 is rendered out of its clutch mode by the momentum of sprocket connector 30. When clutch 38 is so rendered, it assumes a free wheeling mode, eliminating the engagement of the pedal drive and allowing the motor drive to take over the powering of the bike without interference from the pedal drive. Conversely, when pedals 32R and 32L are driven with enough force to create a momentum in the pedal drive which is greater than the momentum in the motor drive, one-way clutch 16 is rendered out of its clutch ode by the momentum of drive sprocket 20. When clutch 16 is so rendered, it assumes a free wheeling mode, eliminating the engagement of the motor drive and allowing the pedal drive to take over the powering of the bicycle without interference from the motor drive.

DESCRIPTION—FIGURE 2

Figure 2:
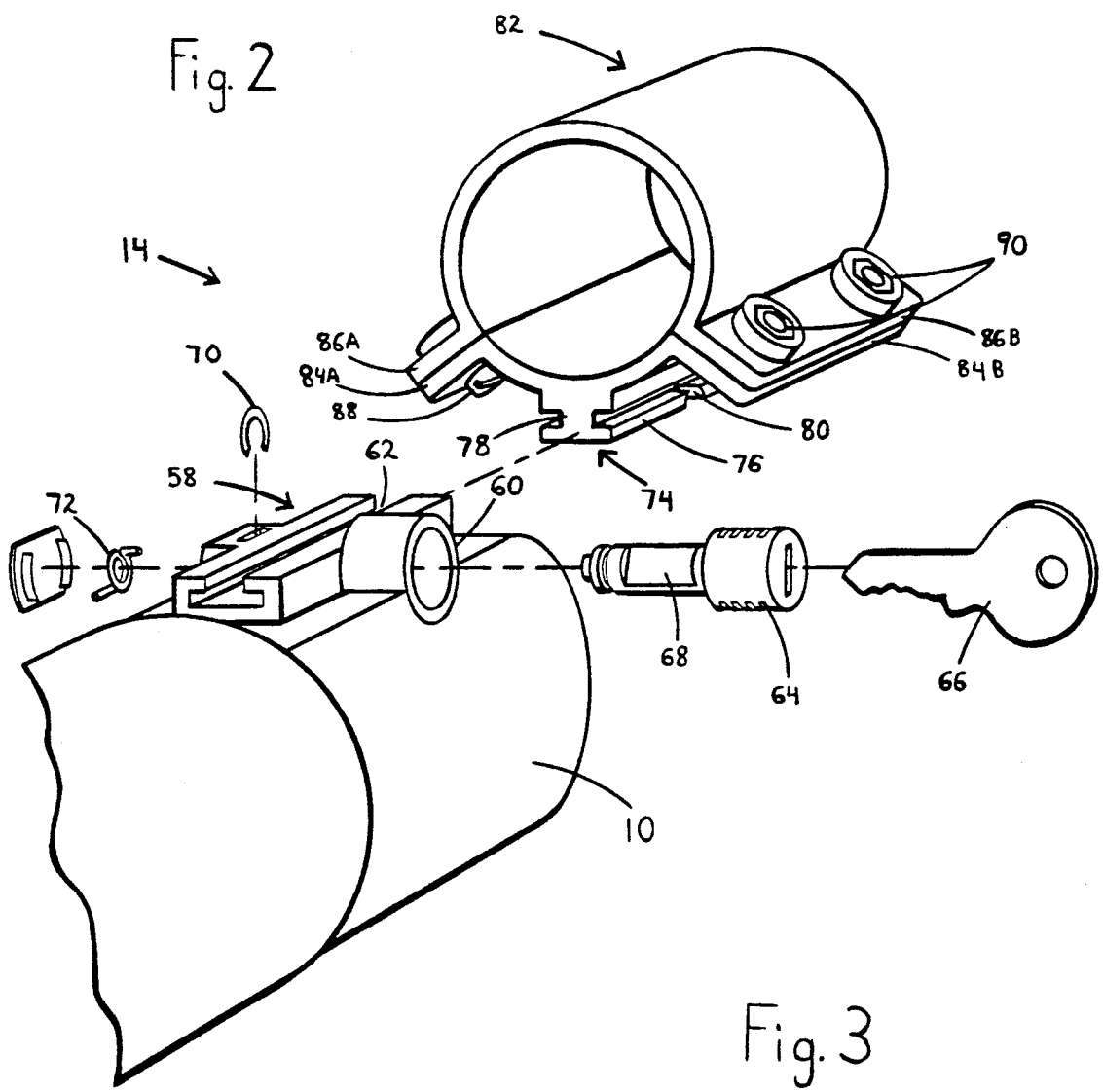
FIG. 2 shows an exploded view of a slide mount.

In accordance with FIG. 2 a slide mount 14 has a rectangular slide bracket 58 with an attached lock casing 60, both of which are constructed as one piece with the enclosure of gearmotor 10. Slide bracket 58 possesses two open lengthwise ends and a semi-closed face with a lengthwise slit 62 down its center. A springed tumbler lock 64 is set in lock casing 60. Lock 64 projects widthwise through the middle of bracket 58. Lock 64 accommodate a key 66. A lock shaft 68 (of lock 64) is rounded on one side and has a flat area on the opposite side which is of the same length as the inner width of the raceway of bracket 58. Lock 64 is held in casing 60 via a retaining ring 70. Ring 70 fits into a slot at the end of casing 60 and anchors around the grooved end of shaft 68. A spring 72 is positioned within casing 60, around the end of shaft 68. One end of spring 72 is anchored into a hole at the end of shaft 68 while the other end of spring 72 anchors to a hole inside casing 60. Spring 72 prods lock 64 into its locked position. In its locked position lock 64 provides an obstruction in the inner raceway of bracket 58. In its retracted position the flat area of shaft 68 is in conformity with the raceway and the raceway is then unobstructed.

Slide mount 14 of FIG. 2 also includes a docking bar 74 which is comprised of a flat rectangular platform 76 and a stem 78 which adjoins platform 76 perpendicularly and lengthwise. Platform 76 is divided widthwise by a notch 80 across its center. Docking bar 74 is of the same length as bracket 58 and interfits snugly into bracket 58.

Docking bar 74 is constructed as one piece with the lower portion of a cylindrical bracket 82. Bracket 82 is comprised of two semi-circular pieces which when adjoined form a hollow cylinder. The lower and upper pieces have a set of flattened lips 84A, 84B, 86A, and 86B at their adjoinment points. The points of adjoinment of the lower and upper portions of bracket 82 are close to and at either side of docking bar 74. Lips 84A and 84B possess two holes apiece for accomodating a set of screws 88 (partially shown in the drawing). When lips 84A and 84B and 86A and 86B are adjoined, the holes in lips 84A and 84B are in uniformity with holes featuring nut housings in lips 86A and 86B. Lips 84A and 84B are adjoined with lips 86A and 86B by screws 88 and nuts 90 (partially shown in the drawing). Clindrical bracket 82 clamps onto the bottom tube of a bicycle frame.

OPERATION—FIGURE 2

In operation key 66 is inserted into lock 64 and turned. The forward end of docking bar 74 is fitted into the forward end of bracket 58 and the motor is manually slid forward until drive sprocket 20 and driven sprocket 22 meet. The slide mount is then in the intermediate position and key 66 can be released and motor drive chain 24 can be attached around drive sprocket 20 and driven sprocket 22 in a manner described later with respect to FIG. 3. Without having to turn the key again motor 10 is then slid back until the corner of lock shaft 68 moves into notch 80. Key 66 is then removed and motor 10 is locked in the mounted position.

DESCRIPTION AND OPERATION—FIG. 3

A manually attaching and detaching drive chain 24 is made up of links of the type which are featured in a standard bicycle roller chain. It is sized to fit around and interconnect drive sprocket 20 and driven sprocket 22 when motor 10 is in the locked position on slide mount 14.

Chain 24 possesses a master link 92 which is made of hardened metal. Master link 92 features embrasures 96A and 96B in the lower forward part of each of its parallel sides 94A and 94B. Embrasures 96A and 96B are slanted inward from the bottom of sides 94A and 94B and lead forward into its forward pin holes 98A and 98B. When motor 10 is in the intermediate position on slide mount 14 chain 24 is provided with enough slack to allow an attaching link 100 and its rearward pin sleeve 102 to be positioned directly under embrasures 96A and 96B. Attaching link 100 is also made of hardened metal.

Sides 94A and 94B of master link 92 have bottom edges which are tapered from the inside to the outside, creating a knifelife edge so that a chain roller 104 which is mounted on pin sleeve 102 easily slips within sides 94A and 94B with manual pressure. Embrasures 96A and 96B provide enough space for pin sleeve 102 to be slipped through and snapped into pin holes 98A and 98B. Roller 104 can ride loosely between sides 94A and 94B as it would within the sides of a standard type master link. Motor 10 is then positioned in the locked, mounted position on slide mount 14 and the chain slack is taken up for chain function.

SUMMARY, RAMIFICATIONS, AND SCOPE

Accordingly, the reader will see that the motorized bicycle drive system of this invention is a sound, simple and compact one whose conspicuous parts are minimal and can be easily removed from and remounted to a bicycle. When featured on a bicycle it will provide a useful and desirable vehicle for people who seek a cheaper means of transportation than a car, a less cumbersome one than a motorcycle or motorscooter, and a less strenuous one than a standard bicycle. It will be desirable, also, to people who are concerned about the environment and would prefer to use a means of transportation whenever possible which better serves environmental concerns.

Although the above description contains several specifics, these specifics should not define the boundaries or scope of the invention, but rather provide an example of the presently preferred embodiment. A variation of the preferred embodiment described with respect to FIG. 1 could be realized which would position the first one-way clutch on the motor drive shaft within the motor, rather than outside of it. In this case the drive sprocket would be attached fixedly onto the motor drive shaft.

Thus, the scope of the invention should be determined by the appended claims and their legal equivalents, rather than by the specific examples given.

We claim:

1. A motorized bicycle drive system comprising:
   (a) an electric motor drive comprising an electric gearmotor, a one-way clutch, said one-way clutch being mounted to said gearmotor, and a drive sprocket, said drive sprocket being mounted onto said one-way clutch, and
   (b) a pedal drive comprising a pedal shaft, means for rotatably mounting said pedal shaft within a bicycle pedal shaft housing, pedals, means for connecting said pedals to said pedal shaft, a multiple speed bicycle front sprocket connector, a sprocket connector hub, a one-way clutch, said one-way clutch being mounted within said sprocket connector hub and onto said pedal shaft, and a motor driveable sprocket with means for detachably mounting to said sprocket connector from the inboard side of said sprocket connector, and
   (c) an interconnecting roller chain having a master roller link, said master roller link comprising a rear pin sleeve, a roller, said roller being rotatably mounted onto said rear pin sleeve, and two flat sides having hook shaped fronts comprising openings which are permanently open and large enough to accommodate the insertion of a sleeved pin of an adjacent link, said flat sides being mounted onto either end of said rear pin sleeve, said interconnecting roller chain being mounted to said drive sprocket and said motor driveable sprocket, and
   (d) means for detachably mounting said motor drive to a multiple speed bicycle comprising a rigid docking member with means for attachment to a multiple speed bicycle, a mating member having means for attachment to said motor drive, means for said rigid docking member to support said motor drive in more than one position, and means for detachably interlocking more than one position, and means for detachably interlocking said mating member with said docking member, whereby said motorized bicycle drive system can be quickly and easily mounted to or removed from a bicycle.

2. The motorized bicycle drive system of claim 1 wherein said means for detachably mounting said motor drive to a multiple speed bicycle is comprised of a locking slide mount comprising:
   (a) a T-shaped docking bar with means for attaching to a bicycle, and
   (b) a slide bracket with means for attaching to said motor drive, and means for slidably engaging said docking bar, and
   (c) a tumbler lock with means for detachably interlocking said docking bar to said slide bracket, said tumbler lock being set within said slide bracket.

3. A motorized bicycle drive system comprising:
   (a) an electric motor drive comprising an electric gearmotor, a one-way clutch, said one-way clutch being mounted to said gearmotor, a motor shaft, said motor shaft being journaled through said one-way clutch, and a drive sprocket, said drive sprocket being mounted to said motor shaft, and
   (b) a pedal drive comprising a pedal shaft, means for rotatably mounting said pedal shaft within a bicycle pedal shaft housing, pedals, means for attaching said pedals to said pedal shaft, a multiple speed bicycle front sprocket connector, a sprocket connector hub, a one-way clutch, said one-way clutch being mounted within said sprocket connector hub and onto said pedal shaft, and a motor driveable sprocket with means for detachably mounting to said sprocket connector from the inboard side of said sprocket connector, and
   (c) an interconnecting roller chain having a master roller link, said master roller link comprising a rear pin sleeve, a roller, said roller being rotatably mounted onto said rear pin sleeve, and two flat sides having hook shaped fronts comprising openings which are permanently open and large enough to accommodate the insertion of a sleeved pin of an adjacent link, said flat sides being mounted onto either end of said rear pin sleeve, said interconnecting roller chain being mounted to said drive sprocket and said motor driveable sprocket, and
   (d) means for detachably mounting said motor drive to a multiple speed bicycle comprising a rigid docking member with means for attachment to a multiple speed bicycle, a mating member having means for attachment to said motor drive, means for said rigid docking member to support said motor drive in more than one position, and means for detachably interlocking said mating member to said docking member, whereby said motorized bicycle drive system can be quickly and easily mounted to or removed from a bicycle.

4. The motorized bicycle drive system of claim 3 wherein said means for detachably mounting said motor drive to a multiple speed bicycle is comprised of a locking slide mount comprising:
   (a) a T-shaped docking bar with means for attaching to a bicycle, and
   (b) a slide bracket with means for attaching to said motor drive, and means for slidably engaging said docking bar, and
   (c) a tumbler lock with means for detachably interlocking said slide bracket to said docking bar, said tumbler lock being set within said slide bracket.

* * * * *

UNITED STATES PATENT AND TRADEMARK OFFICE
CERTIFICATE OF CORRECTION

PATENT NO. : 5,242,028

DATED : September 7, 1993

INVENTOR(S) : Lisa J. Murphy and Thomas E. Mirades

It is certified that error appears in the above-identified patent and that said Letters Patent is hereby corrected as shown below:

Col. 7, line 44, delete "and means for detachably interlocking more than one position,"

Col. 7, line 44, "with" should be changed to --to--.

Signed and Sealed this

Seventeenth Day of May, 1994

Attest:

BRUCE LEHMAN

*Attesting Officer*     *Commissioner of Patents and Trademarks*